United States Patent
Gaddam et al.

(10) Patent No.: US 11,521,197 B2
(45) Date of Patent: Dec. 6, 2022

(54) PAYMENT INSTRUMENT INCLUDING PRIMARY AND AUXILIARY CHIPS

(71) Applicant: Bank of America Corporation, Charlotte, NC (US)

(72) Inventors: Rama Rao Gaddam, Hyderabad (IN); Shailendra Singh, Maharashtra (IN); Sandeep Kumar Chauhan, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/173,415

(22) Filed: Feb. 11, 2021

(65) Prior Publication Data

US 2022/0253829 A1 Aug. 11, 2022

(51) Int. Cl.
*G06Q 20/34* (2012.01)
*G06Q 20/40* (2012.01)
*G06Q 20/32* (2012.01)

(52) U.S. Cl.
CPC ....... *G06Q 20/341* (2013.01); *G06Q 20/3278* (2013.01); *G06Q 20/4018* (2013.01)

(58) Field of Classification Search
CPC ... G06Q 20/341; G06Q 20/352; G06Q 20/357
See application file for complete search history.

(56) References Cited

U.S. PATENT DOCUMENTS

| | | | |
|---|---|---|---|
| 2011/0174874 A1* | 7/2011 | Poznansky | G07F 7/0813 235/379 |
| 2013/0161390 A1* | 6/2013 | Rodriquez | G06K 19/07743 29/829 |
| 2014/0224883 A1* | 8/2014 | Aiyer | G06K 19/07745 235/492 |
| 2016/0267486 A1* | 9/2016 | Mitra | G07F 7/0846 |
| 2018/0157949 A1* | 6/2018 | Wennemer | G06K 19/0725 |
| 2021/0103919 A1* | 4/2021 | Mullen | G06Q 20/4012 |

OTHER PUBLICATIONS

Dual Interface Chip Cards: Contacted and contactless chip technology combined in one (Year: 2017).*
Is Your Card Design Chip-Ready? (Year: 2014).*

* cited by examiner

*Primary Examiner* — Calvin L Hewitt, II
*Assistant Examiner* — Amanulla Abdullaev
(74) *Attorney, Agent, or Firm* — Weiss & Arons LLP

(57) ABSTRACT

Apparatus and methods for a payment instrument are provided. The apparatus may include a primary chip positioned on an outer face of the payment instrument and a power source. The apparatus may include a first supplementary chip, a second supplementary chip, and a third supplementary chip. Each of the first, second and third supplementary chips may be positioned within a thickness of the payment instrument and configured to draw power from the power source.

6 Claims, 11 Drawing Sheets

PAYMENT INSTRUMENT INCLUDING PRIMARY AND AUXILIARY CHIPS

FIELD OF TECHNOLOGY

Aspects of the disclosure relate to providing apparatus and methods for printing and authenticating a payment instrument. In particular, the disclosure relates to apparatus and methods for using a 3D printer to print a payment card and leveraging auxiliary chips positioned inside the payment card for payment card authentication.

BACKGROUND

Currently, a customer who desires to acquire, or replace, a payment instrument needs to place an electronic or in person request for the payment instrument. After submitting the request, there is a wait period during which the payment instrument is fabricated at a remote location and delivered by mail to the customer. Exemplary payment instruments include, but are not limited to, debit cards, credit cards, gift cards, and prepaid cards.

The wait period during which the customer desires, but does not possess, the payment instrument is undesirable. The wait period can result in one or both of customer dissatisfaction and lost revenue.

There is need, therefore, to develop a self-service mechanism by which a customer can print a payment instrument using a 3D printer and subsequently activate the payment instrument using a secure method.

SUMMARY OF THE DISCLOSURE

Apparatus and methods for printing a payment instrument using a 3D printer and for activating the payment instrument at an ATM are provided.

The ATM may be used to activate a payment instrument based at least in part on a placement of a first supplementary chip, a second supplementary chip and a third supplementary chip in the payment instrument.

The ATM may include a housing and a card reader. The card reader may include a slot positioned on the housing and defining an opening through the housing. The slot may be sized to receive and support a card inserted into the ATM.

The card reader may extend into the housing. Within the housing, the card reader may include a first sensor, a second sensor and a third sensor. Each of the first, second and third sensors may be configured to detect near-field communication ("NFC") protocol signals and to register a strength of the NFC signals. The first sensor may be positioned on a first wall of the card reader. The second sensor may be positioned on a second wall, opposite the first wall, of the card reader. The third sensor may be positioned on a third wall of the card reader. The third wall may be opposite the slot.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
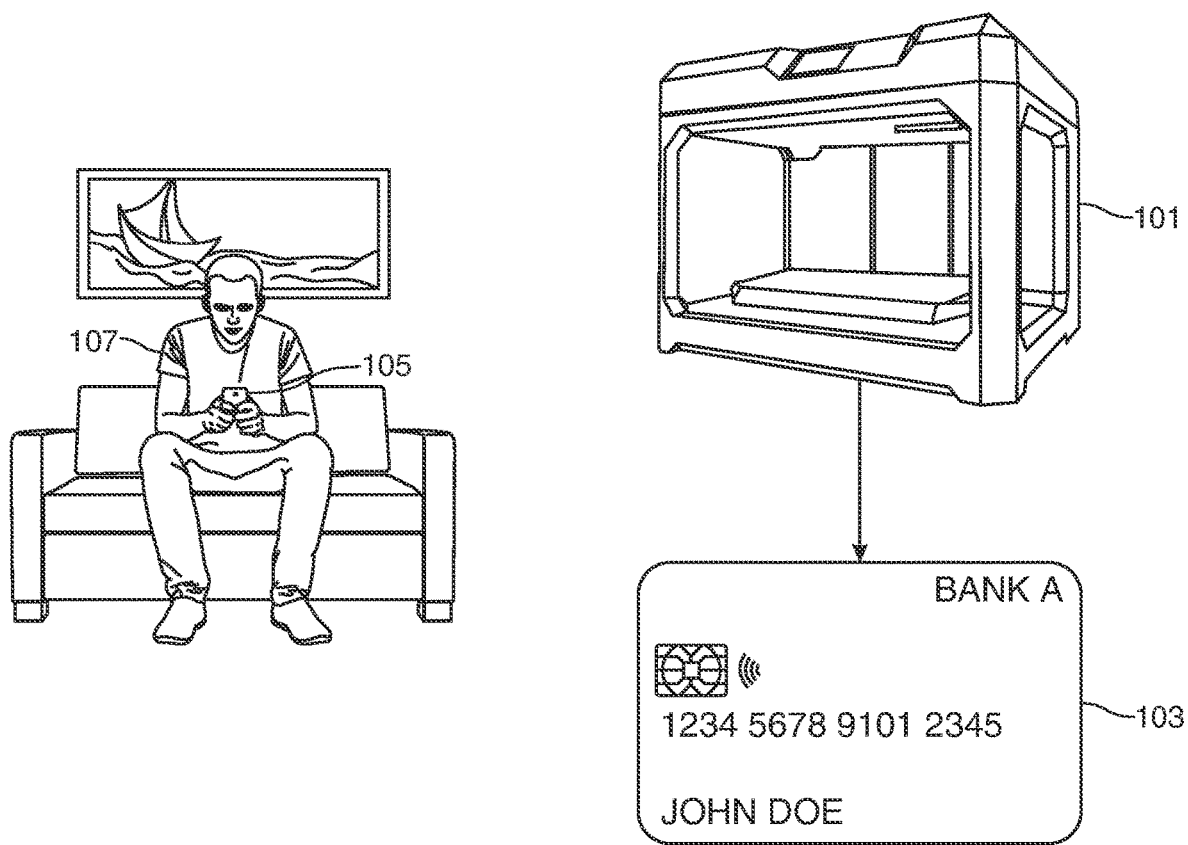
FIG. 1 shows illustrative apparatus and processes in accordance with the invention.

Apparatus and methods for a payment instrument are provided. The payment instrument may be a debit card, a credit card, a gift card, a prepaid card, or any other suitable card. The payment instrument may be referred to alternately herein as a 'card.'

In some embodiments, the payment instrument may have a length of 85.60 mm, a width of 53.98 mm, a thickness of 0.76 mm, and rounded corners having a radius no less than 2.88 mm and no greater than 3.48 mm. The payment instrument may have any other suitable measurements.

The payment instrument may be constructed by a 3-dimensional ("3D") printer. The 3D printer may be part of an automated teller machine ("ATM"). The 3D printer may be positioned at a location different from an ATM or a financial institution, such as in a customer's home, in a mall, at a kiosk, or any other suitable location. The payment instrument may be activated by an ATM. After the printing of the payment instrument, but prior to the activation, the payment instrument may not support a financial transaction.

The payment instrument may include a primary chip positioned on an outer face of the payment instrument. The primary chip may be an EMV (Europay Mastercard Visa) chip. The primary chip may operate according to the protocols and standards of an EMV chip. The primary chip may have the dimensions of an EMV chip. The primary chip may have a length of 1³⁄₁₀th cm. The primary chip may have a width of 1⅕th cm. The primary chip may be spaced 1⅘th cm apart from the first side. The primary chip may be spaced 2⅖th cm apart from the second side. The primary chip may be spaced ⅘th cm apart from the third side.

The EMV chip inserted into the card by the 3D printer may be an open-source chip. The EMV chip inserted into the card may not be programmed with information. Until activation at an ATM at a later time (discussed below), the EMV chip may not support financial transactions.

The payment instrument may include a power source. The power source may be positioned in a thickness of the payment instrument. The power source may be toggled on and off by depression of a depressible button positioned on a face of the payment instrument. The power source may provide power to the supplementary chips. The power source may be rechargeable. The power source may be charged via a contactless recharging station.

The payment instrument may include a supplementary chip. The payment instrument may include two, three, four, or more supplementary chips. For the purposes of the application three supplementary chips are described as being included in the payment instrument. However, it is to be understood that any suitable number of supplementary chips may be included in the payment instrument.

The supplementary chips may be open-source chips. The supplementary chips may include a vendor ID number. For example, the supplementary chips may be silicon chips or any other suitable microchip. The supplementary chips may be capable of transmitting information.

The supplementary chips may comprise an erasable programmable read-only memory ("EPROM"). The supplementary chips may be programmed by the 3D printer and/or, during activation, at an ATM.

In exemplary embodiments, the payment instrument may include a first supplementary chip, a second supplementary chip, and a third supplementary chip. The first, second and third supplementary chips may be positioned within a thickness of the payment instrument. The supplementary chips may be positioned in the thickness by the 3D printer. The supplementary chips may be configured to draw power from the power source.

The supplementary chips may not be visible to a user when looking at the payment instrument. A portion of the supplementary chips may not protrude above a plane defined by an outer surface of the card. Thus, the position of the supplementary chips within the payment instrument may be unknown to someone looking at the card.

The supplementary chips may support electronic communication using near field communication ("NFC") protocol. The supplementary chips may be configured to communicate with the primary chip using the NFC protocol.

The supplementary chips may emit an NFC signal when powered by the power source. In some embodiments, each of the supplementary chips may emit the same NFC signal. In some embodiments, the first supplementary chip may emit a first NFC signal, the second supplementary chip may emit a second NFC signal, and the third supplementary chip may emit a third NFC signal.

The 3D printer may program each chip with position data. The position data may include a location of the chip in the card. The position data may include an X,Y coordinate. The position data may include an X,Y,Z coordinate. The position data may be included in printing instruction data received by the 3D printer from a banking application in a first payload.

For example, the first supplementary chip may be programmed with first position information identifying a location of the first supplementary chip within the payment instrument. A second supplementary chip may be programmed with second position information identifying a location of the second supplementary chip within the payment instrument. A third supplementary chip may be programmed with third position information identifying a location of the third supplementary chip within the payment instrument.

Each of the first, second and third positions may include an X,Y coordinate. Each of the first, second and third positions may include an X,Y,Z coordinate. The axes used to determine the coordinate data may include an X-axis extending along a length of the card, a Y-axis extending along a width of the card, and, in some embodiments, a Z-axis extending along a thickness of the card. The axes used to determine the coordinate data may include an X-axis extending along a width of the card, a Y-axis extending along a length of the card, and, in some embodiments, a Z-axis extending along a thickness of the card.

In some embodiments, when the supplementary chips are powered by the power source, each of the first, second and third supplementary chips may be triggered to transmit their position information to the primary chip. The data may be transmitted using the NFC protocol. The primary chip may transmit the received position information to a POS device during a transaction. This data may be used during the transaction for card validation. Receipt of incorrect position information during a transaction by a payment processing network and/or an issuer may cause the network/issuer to decline the transaction.

The payment instrument may include information imprinted on an outer face of the payment instrument. Exemplary information may include a card number, a customer name and a card expiry date. When the card is a credit card, the information may include a CVV code and a payment processing network.

After the payment instrument has been printed by the 3D printer, the primary chip may not be programmed with payment instrument information and may not support an electronic transaction.

After activation of the payment instrument by an ATM, the payment instrument may be configured to be programmed with payment instrument information and to support electronic transactions.

When the primary chip is an EMV chip, the EMV chip, when programmed, may support credit card transactions. The primary chip, when programmed, may support debit card transactions. The primary chip, when programmed, may store a gift card value and supports transactions having a value no greater than the gift card value.

In some embodiments, execution of a transaction using the payment instrument may include transmitting position data of the supplementary chip(s). The position data may be checked to match stored position data on a financial platform. Failure to transmit position data associated with the card on the financial platform may result in the declining of the financial transaction. In some embodiments the supplementary chips may transmit their position data using NFC to a POS. In some embodiments the supplementary chips may transmit their position data to the primary chip using NFC and the primary chip may communicate the position data to the POS and/or the data may be read from the primary chip by the POS.

The apparatus may include an ATM. The ATM may be used to activate a payment instrument based at least in part on a placement of one, two, three or more supplementary chips within the payment instrument. For the purposes of the application, the ATM is described as determining the placement of a first supplementary chip, a second supplementary chip and a third supplementary chip in a thickness of the payment instrument. However, it is to be understood that any suitable number of supplementary chips may be used.

The ATM may be used to print a payment instrument using a 3D printer included in the ATM and subsequently activate the payment instrument.

The ATM may perform one or more of the methods described herein.

The ATM may include a housing. The ATM may include a card reader. The card reader may include a slot positioned on the housing and defining an opening through the housing. The slot may be sized to receive and support an item, such as a payment instrument, inserted into the ATM.

The card reader may extend within the housing. The card reader, in the housing, may include a first sensor, a second sensor and a third sensor. Each of the first, second and third sensors may be configured to detect near-field communication ("NFC") protocol signals and to register a strength of the NFC signals. The first sensor may be positioned on a first wall of the card reader. The second sensor may be positioned on a second wall, opposite the first wall, of the card reader. The third sensor may be positioned on a third wall of the card reader. The third wall may be opposite the slot. The sensors may be positioned at any other suitable location(s) within the card reader. One or two sensors, or four, five, or more sensors, may be used instead of the three sensors described herein.

The ATM may include a processor in electronic communication with the card reader. The processor may be configured to receive a request from a customer to activate a payment instrument inserted into the slot. A customer may input the request by selecting one or more selectable options displayed on an ATM display screen. The processor may transmit a request to a central server for an activation payload associated with the customer. The activation payload may include placement information of a first supplementary chip, a second supplementary chip, and a third supplementary chip within the payment instrument.

The placement information may include a x,y coordinate for each of the supplementary chips. The placement information may include an x, y, z coordinate for each of the supplementary chips.

The processor may be configured to activate the first, second and third sensors to detect NFC signals within the card reader. The processor may receive, from the first, second and third sensors, NFC data captured by each of the first, second and third sensors.

The processor may map the NFC data to a position of a first chip, a second chip and a third chip within the payment instrument. In some embodiments, when the processor determines that a position of the first, second and third chip is substantially equivalent to the position of the first, second and third supplementary chips as stored in the activation payload, the processor may program a primary chip of the payment instrument with payment instrument information received from the activation payload. For the purposes of the application, a value is 'substantially' similar to a second value if the two values differ by +/−5%.

In some embodiments, when the processor determines that a position of the first, second and third chip as mapped by the processor, received by the NFC or read from the primary chip, is equivalent to the position of the first, second and third supplementary chips as stored in the activation payload, the processor may program a primary chip of the payment instrument with payment instrument information received from the activation payload.

In some embodiments, each supplementary chip may store its position data as detailed herein. In some embodiments, each supplementary chip may communicate its position data to the processor using NFC. The card reader may include a receiver to receive the communicated NFC data. In some embodiments, the sensors may be configured to read position information included in the NFC data emitted by the supplementary chips.

In some embodiments, each supplementary chip may communicate its position data to the primary chip using NFC. The card reader may then read the position data from the primary chip using a card reader.

For example, in some embodiments, the card reader may be further configured to read information stored on the primary chip, such as an EMV chip included on the payment instrument inserted into the slot. The information may include a first position of the first supplementary chip on the payment instrument, a second position of the supplementary second chip on the payment instrument and a third position of the third supplementary chip in the payment instrument.

The processor may then determine if each of the first position, the second position and the third position is equivalent to the position of the first, second and third supplementary chips stored in the activation payload. If one or more of the first position, the second position and the third position are not equivalent to the position of the first, second and third supplementary chips stored in the activation payload, the processor may decline the request from the customer to activate the payment instrument.

Position data stored on the supplementary chips may be used in addition to the position data calculated by the processor based on the NFC signals received by the sensors. Position data stored on the supplementary chips may be used in place of the processor mapping position data of the supplementary chips via signals received by the sensors.

The programming of the primary chip, once the position data mapped by the processor and/or read from the primary chip is determined to be accurate, may include loading the primary chip with information included in the activation payload. The information may include one or more of customer information, a payment instrument processing network, a payment instrument identifier and/or any other suitable information for enabling the payment instrument to support financial transactions.

The payment instrument may be a debit card, credit card and/or a gift card.

The mapping may include identifying, at each of the first, second and third sensors, a first NFC signal, a second NFC signal, and a third NFC signal. The mapping may include quantifying a strength of the first NFC signal registered at the first sensor, a strength of the first NFC signal registered at the second sensor, and a strength of the first NFC signal registered at the third sensor. Based on the quantified strengths of the first NFC signal at the first, second and third sensors, the processor may generate a location of the first chip within the payment instrument. The location may be an X,Y, or an X,Y,Z, coordinate.

The mapping may include quantifying a strength of the second NFC signal registered at the first sensor, a strength of the second NFC signal registered at the second sensor, and a strength of the second NFC signal registered at the third sensor. Based on quantified strengths of the second NFC signal at the first, second and third sensors, the processor may generate a location of the second chip within the payment instrument; and The processor may quantify a strength of the third NFC signal registered at the first sensor, a strength of the third NFC signal registered at the second sensor, and a strength of the third NFC signal registered at the third sensor. Based on quantified strengths of the third NFC signal at the first, second and third sensors, the processor may generate a location of the third chip within the payment instrument.

The ATM may also be configured to print a payment instrument using a 3D printer included in the ATM using steps described herein. The payment instrument printed may be the payment instrument activated using steps described herein.

In some of these embodiments, the ATM may be configured to activate a first payment instrument as described above. The first payment instrument may be printed at a 3D printer separate from the ATM. The ATM may also be configured to print a second payment instrument at the ATM. The second payment instrument may be printed using one or more of the methods described herein.

The processor may be configured to receive a request from the customer to print a second payment instrument. The processor may instruct the 3D printer to print the second payment instrument. The ATM may then print the second payment instrument using the 3D printer. After the printing, card reader may program a chip included on the second payment instrument with customer information and payment instrument information.

The ATM may include a display. The display may be configured to display to the customer a plurality of card art for applying to the second payment instrument. The display may be a touch screen. The touch screen may receive a selection from the customer of a card art. The 3D printer may apply the card art selected by the customer to the second payment instrument.

Systems and methods of the invention may include methods for activating a payment instrument based at least in part on a placement of a first supplementary chip, a second supplementary chip and a third supplementary chip in a thickness of a payment instrument. The methods may include method steps performed by a mobile phone, a 3D printer, an ATM, a banking application and/or a financial institution platform. Methods performed by one of the mobile phone, a 3D printer, ATM, banking application and/or financial institution platform described herein may be performed alternatively by a different one of the mobile phone, a 3D printer, ATM, banking application and/or financial institution platform.

The methods may include receiving a request from a customer to activate the payment instrument, the payment instrument being inserted into a slot of a card reader included in the ATM. The customer may input the request into the ATM using a touch screen, keypad, or communicate the request to the ATM using a customer mobile phone.

The methods may include the ATM transmitting a request to a central server for an activation payload associated with the customer. The activation payload may include placement information of the first supplementary chip, the second supplementary chip, and the third supplementary chip within the payment instrument.

The methods may include receiving the activation payload from the central server. The methods may include activating a first sensor, a second sensor and a third sensor positioned in the card reader to detect NFC signals within the card reader.

The methods may include receiving from the first, second and third sensors NFC data captured by each of the first, second and third sensors. The methods may include correlating the NFC data to a position of a first chip, a second chip and a third chip within the payment instrument.

When the position of the first, second and third chip is determined to be substantially equivalent to the placement information of the first, second and third supplementary chips, the methods may include programming a primary chip of the payment instrument with payment instrument information received from the activation payload.

When the position of the first, second and third chip is determined to be different from the placement information of the first, second and third supplementary chips, the methods may include programming the primary chip of the payment instrument with information identifying the payment instrument as an unauthorized payment instrument. Such information, when received by a POS, payment processing network, and/or an issuer, may automatically generate a declining of a request to complete a transaction.

Instead of, or in addition to, receiving NFC data from the first, second and third sensors, the method may include reading data on a primary chip included on the payment instrument. The data may include a first position of a first supplementary chip in the payment instrument, a second position of a second supplementary chip in the payment instrument, and a third position of a third supplementary chip in the payment instrument.

When the first position, the second position and the third position are equivalent to placement information of the first, second and third supplementary chips stored in the activation payload, the method may include programming the primary chip of the payment instrument with payment instrument information received from the activation payload. When the first position, the second position and the third position are different from the placement information of the first, second and third supplementary chips, the method may include programming the primary chip of the payment instrument with information identifying the payment instrument as an unauthorized payment instrument.

When the method includes both correlating the NFC data to determine positions of the three supplementary chips, and reading position data from the primary chip, the card may be activated only if the correlated position data is substantially equivalent to the activation payload position data and the position data from the primary chip is equivalent to the activation payload position data. If either, or both, of the aforementioned data are not substantially equivalent/equivalent, then the method may include programming the primary chip with information identifying the payment instrument as an unauthorized payment instrument.

When the payment instrument is a credit card, the methods may include, prior to the activating, using the card reader to read data imprinted on the payment instrument the data including a card number, a CVV code and card expiry date. The methods may also include comparing the data imprinted on the payment instrument with card data included in the activation payload.

The methods may include, in response to a determination that data imprinted on the payment instrument does not match data in the activation payload, programming the primary chip with information identifying the payment instrument as an unauthorized payment instrument.

When the payment instrument is a first payment instrument, the methods may include receiving from the customer a request to print a payment instrument at the ATM.

The payment instrument may be a second payment instrument. The request may include payment instrument type and card art. The methods may include instructing a 3D printer included in the ATM to print the second payment instrument. The methods may also include printing the second payment instrument such that the second payment instrument includes a card number and the card art.

In some embodiments, the customer request may be a second customer request. The methods may include a first customer request to print the payment instrument. The ATM may print the payment instrument as described herein. After printing of the payment instrument, the customer may place the payment instrument into the card reader and the activation payload may be used to authenticate and activate the payment instrument as described above.

The method may further include displaying, on a display screen included in the ATM, a plurality of selectable card options. The selectable card options may be options for applying to the payment instrument during the printing and/or during the activating. The selectable card options may include one or more of a card type, two or more payment processing networks, card art and a credit limit.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows illustrative apparatus and process 100. In FIG. 1, customer 107 is shown holding mobile phone 105. 3D printer 101 is positioned adjacent customer 107. 3D printer 101 may be located at customer 107's home or office, or at a store, shopping mall, kiosk, or any other suitable location.

Payment instrument 103 is illustrated as being printed by 3D printer 101. Systems and methods for using a mobile phone, such as mobile phone 105, to instruct 3D printer 101 to print payment instrument 103 is described above and in connection with the subsequent figures.

Payment instrument 103 may include one, two, three or more supplementary chips. The supplementary chips may be embedded in a thickness of payment instrument 103 and not visible to an onlooker.

Figure 2:
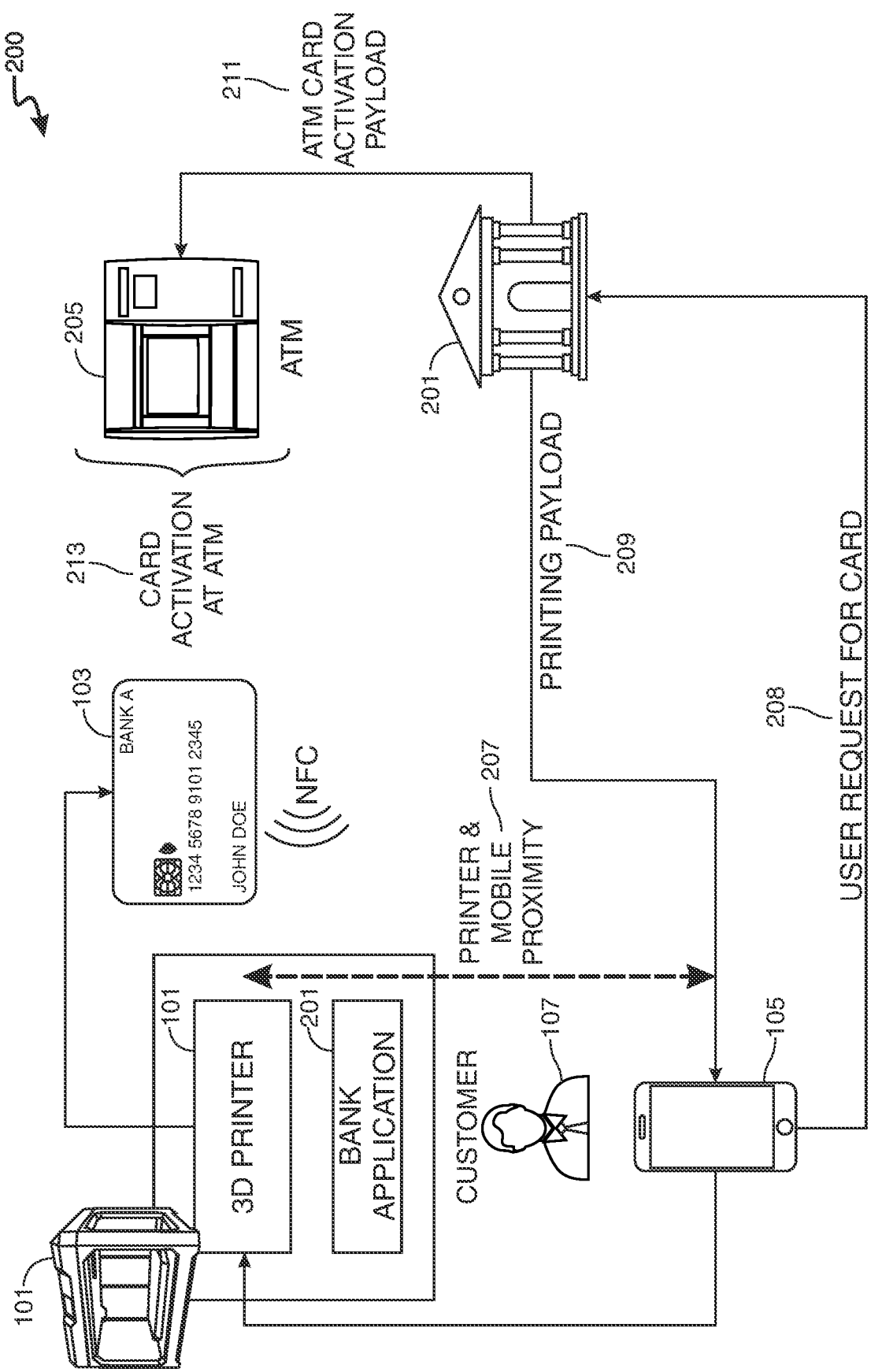
FIG. 2 shows an illustrative method in accordance with the invention.

FIG. 2 shows illustrative method 200. Illustrative method 200 includes methods for using mobile phone 105 to instruct 3D printer 101 to print payment instrument 103. Illustrative method 200 also includes methods for using ATM 205 to activate payment instrument 103.

In FIG. 2, mobile phone 105 is shown in electronic communication with 3D printer 101. 3D printer 101 may be loaded with one or more chips. The chips may include a primary chip, such as an EMV chip, and/or one or more secondary chips. The chips may be included in a chip cartridge for being inserted into the 3D printer and included in payment instrument 103.

Customer 107 may use mobile phone 105 to transmit user request for card 208 to banking application 201. Banking application 201 may include, and execute methods using, a central server. Banking application 201 may validate the identity of the customer. For example, banking application 201 may ask the customer to input one or more of a customer ID, a customer PIN/passcode, or any other suitable verification information.

Once the identity of the customer is validated, banking application 201 may request permission, from the customer, to access a local network of the customer. The local network may be a network to which both mobile phone 105 and 3D printer 101 are connected to. Upon connection of banking application 201 to the network, banking application 201 may establish electronic communication with 3D printer 101 over the local network. In some embodiments, banking application 201 may communicate with 3D printer 101 through mobile phone 105.

Banking application 201 may display to the customer multiple selectable options relating to payment instrument 103. For example, the customer may be presented with the option(s) of selecting one or more of a card type (e.g. credit card, debit card, gift card, etc.), card art for displaying on the card, a credit/gift card limit, and any other suitable card options. Upon receipt of the selected card information, banking application 201 may determine whether or not the customer is eligible for a payment card with the selected card characteristics. For example, banking application 201 may determine whether or not the customer is eligible for a credit card having the selected credit limit of $5,000. Banking application 201 may communicate with one or more financial platforms and/or central servers to execute one or more of the functions described herein. Functions described as being executed by banking application 201 may be performed instead by a financial services platform.

In some embodiments, banking application 201 may only present to the customer payment card options for which the customer is eligible to receive. In some of these embodiments, banking application 201 may first run a credit check on the customer to determine whether or not the customer is eligible for a new credit or debit card. In the event that banking application 201 determines the customer to be eligible for one or both of a new credit or debit card, banking application 201 may display to the customer the option(s) of printing at a customer 3D printer the eligible debit/credit card(s).

Upon selection, by the customer, of payment card characteristics for which the customer is eligible to receive, banking application 201 may create a payload. The payload may include customer identifying information, payment card characteristics, a card number, card expiry date, CVV number, and any other suitable payment card information. The payload may also include a location for placing one, two, three or more supplementary chips in a thickness of the payment card.

Banking application 201 may create a first payload and a second payload. The first payload may be printing payload 209. The first payload may include information for transmitting to 3D printer 101. The first payload may include information for printing payment instrument 103. The first payload may be transmitted to mobile phone 105. The first payload may be transmitted to 3D printer 101 through the local network. When an ATM is used to print a payment instrument, the ATM may receive both the first and second payload from the financial services platform.

The second payload may be the activation payload. The second payload may include information for transmitting to ATM 205 to activate the payment instrument after the printing of the payment instrument at a 3D printer. The second payload may be ATM card activation payload 211. The second payload may be used by the ATM for card activation at ATM 213. The second payload may include information for validating payment instrument 103 and activating payment instrument 103. Activating payment instrument 103 may include programming a primary chip included on payment instrument 103 to support electronic transactions.

Banking application 201 may transmit the first payload to 3D printer 101 and store the second payload on the central server.

The first payload may then be transmitted to 3D printer 101. 3D printer 101 may use the first payload to print payment instrument 103.

During the printing of payment instrument 103, banking application 201 may run one or more security features to circumvent fraudulent usage of the payment card print applications. Exemplary security features include verifying that a printer IP address of the 3D printer matches a printer IP address stored on the mobile phone 105, verifying that a geolocation of mobile phone 105 identifies a home residence location, or a city of residence location, of the customer, and only supporting the printing of the payment card while banking application 201 is connected to the local network. Additional exemplary security features may include monitoring printer and mobile proximity 207. When the proximity between mobile phone 105 and 3D printer 101 exceeds a predetermined distance, the printing of the payment card may be terminated.

In some embodiments, a security features may be determined to have been violated after the printing of payment instrument 103 has been completed. In these embodiments, banking application 201 may update the second payload with instructions not to activate the payment card when the payment card is inserted into an ATM for activation.

Figure 3:
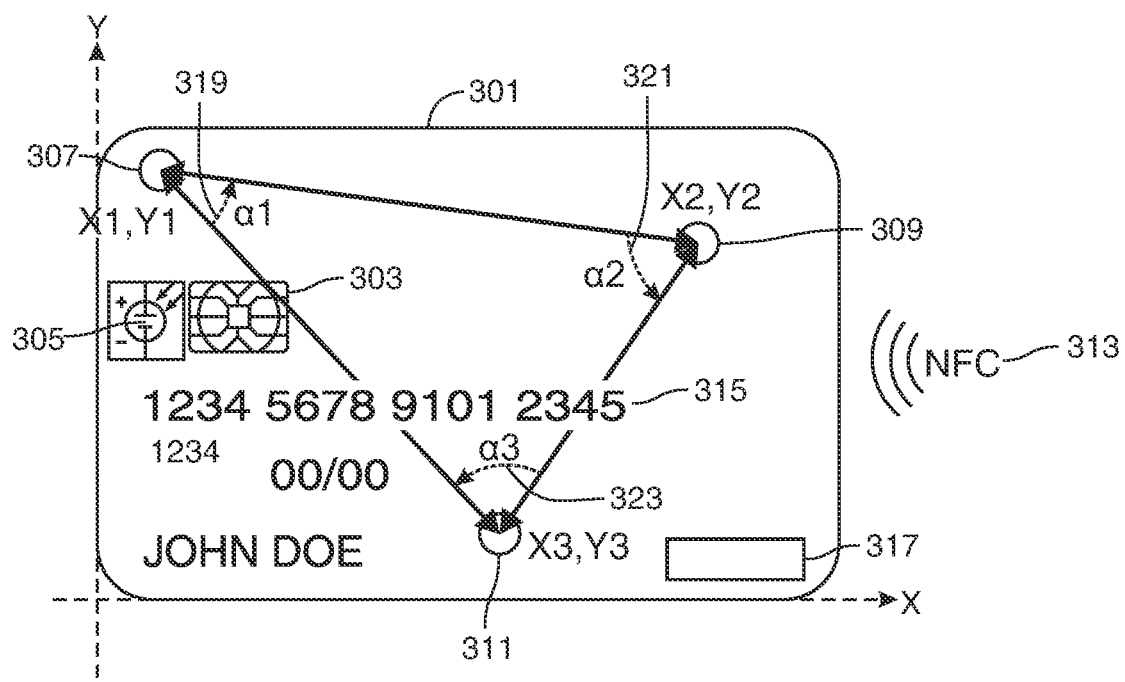
FIG. 3 shows an illustrative payment instrument in accordance with the invention.

FIG. 3 shows illustrative payment instrument 301. Illustrative payment instrument 301 may include primary chip 303 and one or more supplementary chips. In FIG. 3, payment instrument 301 is shown including first supplementary chip 307, second supplementary chip 309 and third supplementary chip 311.

In FIG. 3, supplementary chips 307, 309 and 311 are shown for illustrative purposes. However, it is to be understood that supplementary chips 307, 309 and 311, and supplementary chips illustrated in subsequent figures, may be embedded in a thickness of a payment instrument and not visible to an onlooker.

Each of the supplementary chips may be associated with a position on payment instrument 301. The position may be an X, Y coordinate. In some embodiments, the position may be an X,Y,Z coordinate, with the Z axis extending along at thickness of the card (not shown). The position may be the position of a midpoint of a supplementary chip.

The X axis may extend along a bottom edge of the card and the Y axis may extend along a left edge of the card. The X axis may extend along a first edge of the card, and the Y axis may extend along as second edge of the card, perpendicular to the first edge of the card. In FIG. 3, first supplementary chip 307 is associated with position X1,Y1, second supplementary chip 309 is associated with position X2,Y2 and third supplementary chip 311 is associated with position X3,Y3.

The first, second and third supplementary chips may define vertices of a triangle. A first side of the triangle may extend between first supplementary chip 307 and second supplementary chip 309. A second side of the triangle may extend between second supplementary chip 309 and third supplementary chip 311. A third side of the triangle may extend between third supplementary chip 311 and first supplementary chip 307.

Angle $\alpha 1$ may define an angle between the first side and the third side. Angle $\alpha 2$ may define an angle between the first side and the second side. Angle $\alpha 3$ may define an angle between the second side and the third side.

One or both of the X,Y coordinates of each of the supplementary chips and values of angles $\alpha 1$, $\alpha 2$ and $\alpha 3$ may be included in the first payload and/or in the second payload.

Payment instrument 301 may include information in information box 317. Exemplary information may include a name of a payment processing network (e.g. Visa®, MasterCard®, American Express®). Payment instrument 301 may also include card number 315 and a name of a customer ("John Doe").

Payment instrument 301 may include power source 305. Power source 305 may be embedded in a thickness of payment instrument 301. Payment instrument 301 may support communications based on the near-field communication protocol ("NFC") 313

Figure 4:
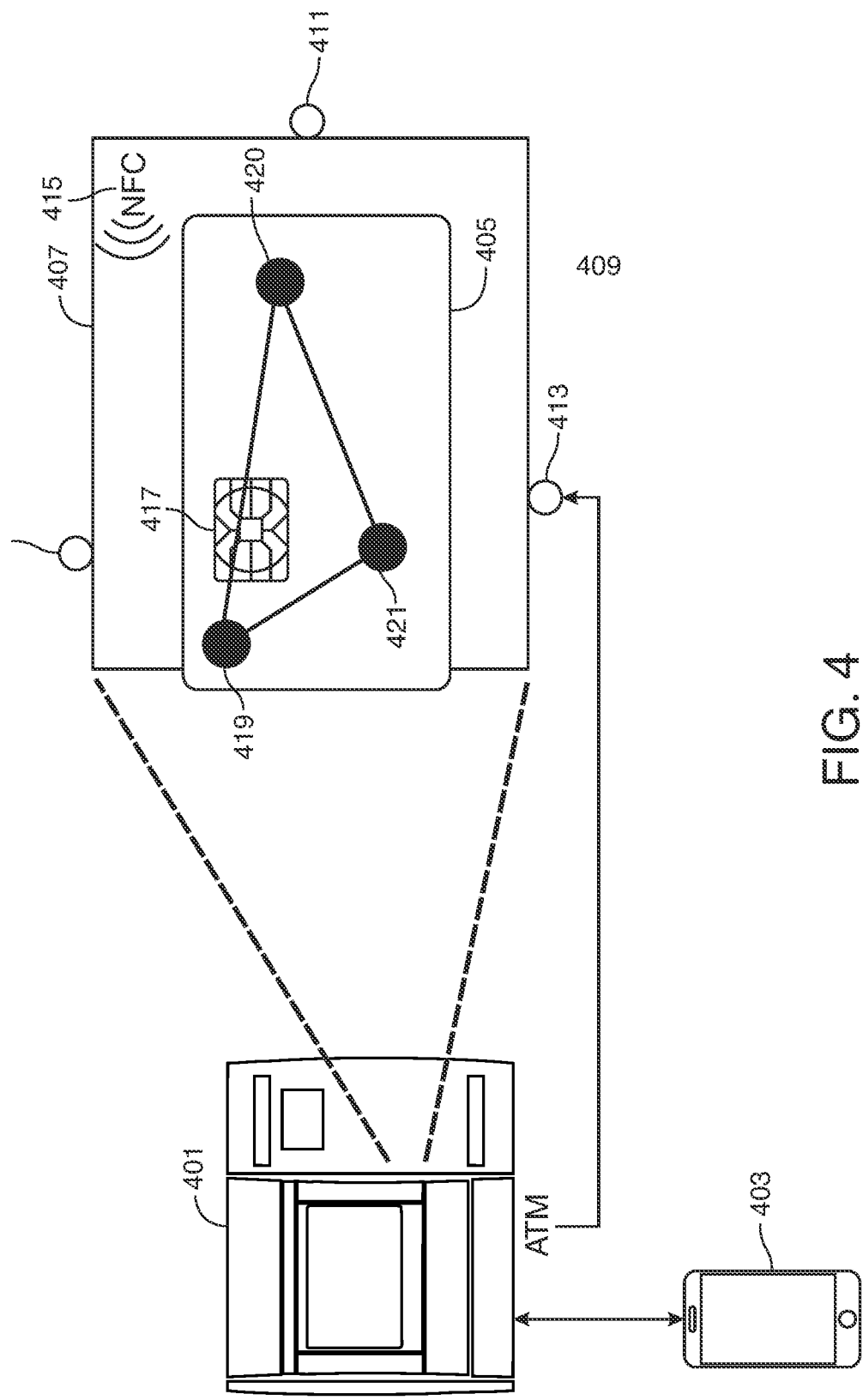
FIG. 4 shows illustrative apparatus in accordance with the invention.

FIG. 4 shows illustrative apparatus in accordance with the invention. In FIG. 4, mobile phone 403 of a customer is in electronic communication with ATM 401. Additionally, in FIG. 4, payment instrument 405 has been inserted through a slot included in card reader 407 of ATM 401 and is being supported by card reader 407.

Payment instrument 405 includes primary chip 417, first supplementary chip 419, second supplementary chip 420 and third supplementary chip 421. In FIG. 4, payment instrument 405 is illustrated giving off NFC signals.

Card reader 407 is shown including first sensor 409, second sensor 411 and third sensor 413. Each of sensors 409, 411 and 413 may be used by ATM 401 to measure a strength of NFC signals received when payment instrument 405 is in card reader 407. The strength of the NFC signals measured by sensors 409, 411 and 413 may be used by ATM 401 to calculate the position of three supplementary chips within payment instrument 405. The calculated position may then be compared to a position of the supplementary chips stored in a second payload to determine whether to activate payment instrument 405.

Figure 5:
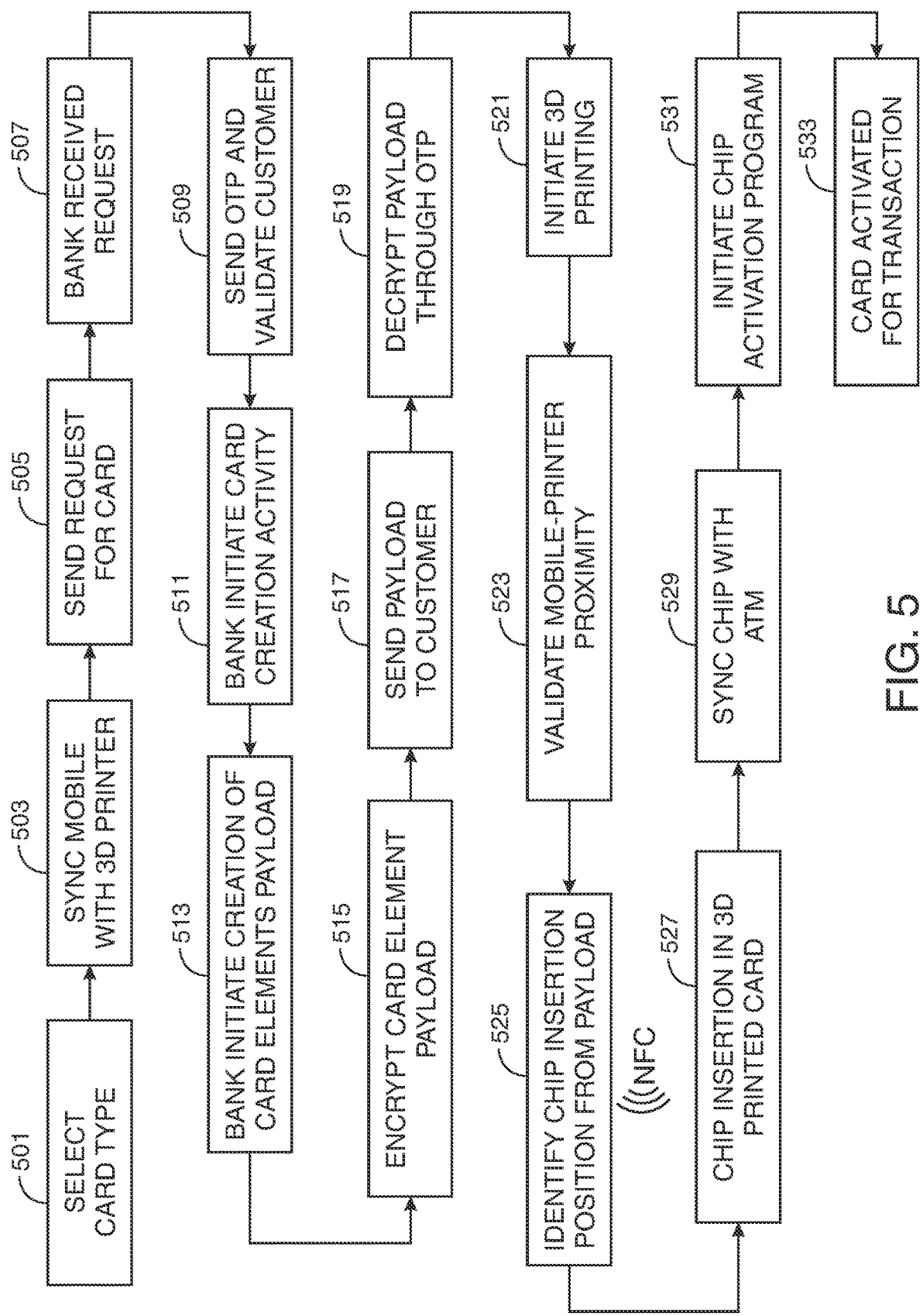
FIG. 5 shows an illustrative method in accordance with the invention.

FIG. 5 shows an illustrative method in accordance with the invention. The method illustrated in FIG. 5 may be used when a customer desires to print a payment instrument using a 3D printer and subsequently active the payment instrument at an ATM.

At step 501, the customer may select a card type. For the purposes of the application, 'card' and 'payment instrument' may be used interchangeably.

Exemplary card types may include a credit card, a debit card, a gift card, and any other suitable type of payment card. The customer may select the card type on a banking application displayed on a mobile phone or any other personal computing device. At step 503, the banking application may sync the mobile phone with a 3D printer. At step 505, the banking application may send to a financial services platform a request to print a card. The customer may generate the request by selecting a 'print now' icon, or similar icon, displayed by the banking application in the customer's mobile phone.

At step 507 the financial services platform may receive the customer's request. For FIG. 5, the term 'BANK' may be used interchangeably with 'financial services platform.' At step 509, the financial services platform may create the first payload and the second payload. The first payload may include information for transmitting to a 3D printer for printing a payment instrument. The second payload may include information for validating the payment instrument at an ATM and activating the payment instrument.

The first and second payload may be stored on the platform in an encrypted form. In some embodiments, one or both of the first and second payload may be decrypted after receipt of an OTP from the customer. The OTP, when received, may trigger the platform to decrypt the payload. The OTP may be generated using customer information such as a customer name and payment instrument information. The OTP may be associated with an expiry date.

The platform may transmit a one-time pin ("OTP") to the customer to validate the customer. When the customer enters the one-time pin in the banking application, the customer may be validated. At step 511, the financial services platform may initiate card creation activity. Card creation activity may include the creation of the payload at step 513.

At step 513, the financial services platform may initiate the creation of a card elements payload. The card elements payload may be the first payload. The card elements payload may include customer information, a card type, card art, a card number, a card expiry date, a CVV number, a placement location of a primary chip and one or more secondary chips within a thickness of the card, placement location of a customer name, the card number, card expiry date and CVV number on a face of the card, and any other suitable information needed by the 3D printer to print the card.

Information included in the card elements payload may also include validation parameters. The validation parameters may be used by the banking application to ensure the security of the 3D printing of the card. Exemplary validation parameters may include an IP address of the printer, a proximity between the mobile phone and the 3D printer that must be maintained during the printing, an acceptable range of geolocations of the mobile phone and/or the 3D printer during the printer, and any other validation parameters described herein.

At step 515 the card element payload may be encrypted by the financial services platform. At step 517 the financial services platform may transmit the card element payload to the customer via the banking application. At step 519 the banking application may decrypt the card payload through a one-time pin ("OTP") as explained above.

At step 521 the banking application may initiate the 3D printing of the card using the 3D printer synced to the mobile phone at step 503. The initiation of the 3D printing may include transmitting some of the information included in the card element payload to the 3D printer. At step 523 the banking application may validate a mobile phone-printer proximity. This validation may occur prior to the initiation of the 3D printing. This validation may include throughout the 3D printing. At step 525, the 3D printer may identify chip insertion positions from the payload. The chip insertion positions may include the positions of the primary chip and the positions of the one, two three or more supplementary chips.

At step 527 the 3D printer may insert the primary and secondary chip(s) into the card. At step 529 the customer may insert the card into a card reader at an ATM. At step 531 the customer may initiate a chip activation program. The chip activation program may be used to activate the primary chip. Without activation of the primary chip, the card may be not be configured to support a financial transaction. At step 533 the ATM may validate the card as described herein and activate the primary chip so that the card may support financial transactions.

The ATM validation of the card and primary chip activation may be performed using the second payload. The second payload may be stored in an encrypted state on the financial services platform. The second payload may be decrypted using an OTP entered, by the customer, into the ATM. The OTP may be transmitted to the customer by a banking application. The OTP may be generated using a combination of customer information, such as a customer name and card data. The OTP may include an expiry date. The data may be stored in a database with alignment data. The alignment data may specify data that, when received from an ATM, will initiate the decryption of the second payload. The alignment data may include the OTP.

Figure 6:
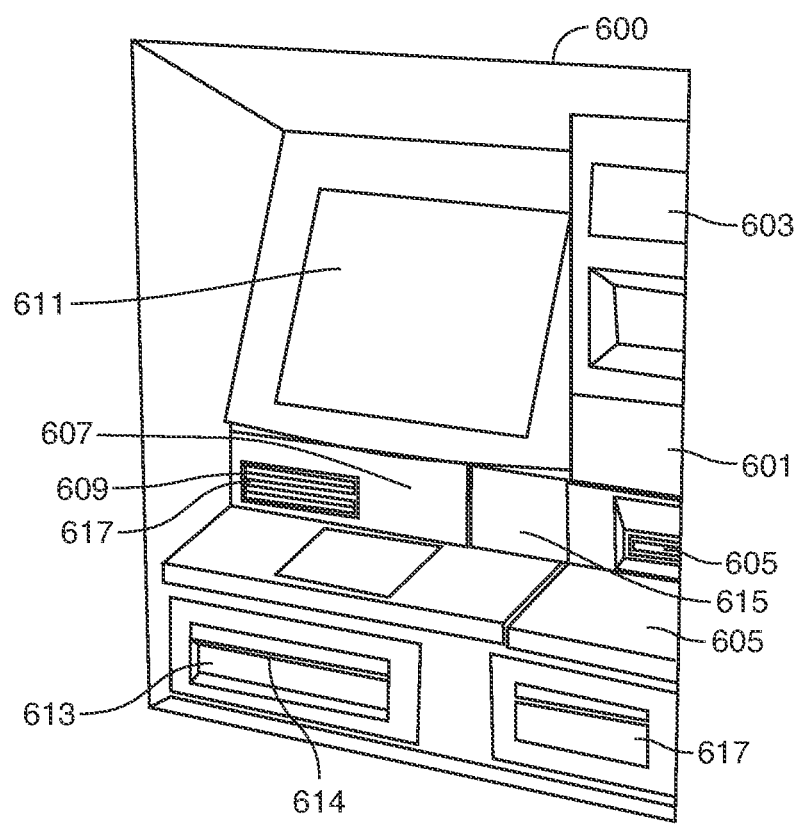
FIG. 6 shows illustrative apparatus in accordance with the invention.

FIG. 6 shows illustrative ATM 600 in accordance with the invention. ATM 600 may be used to print a payment instrument using a 3D printer included in ATM 600 as described herein. ATM 600 may additionally, or alternatively, be used to verify and activate a payment instrument printed using a 3D printer at a customer's home or other location different from ATM 600.

ATM 600 may include ATM power module 601 and ATM network module 603. ATM 600 may include Card 3D printer 605. Card 3D printer 605 may include 3D card dispense slot 617.

ATM 600 may include display screen 611.

ATM 600 may include card chip authentication module 607. ATM 600 may include currency box 613, card reader 609, cash dispense slot 614, card insert slot 617 and central processing unit 615.

Figure 7:
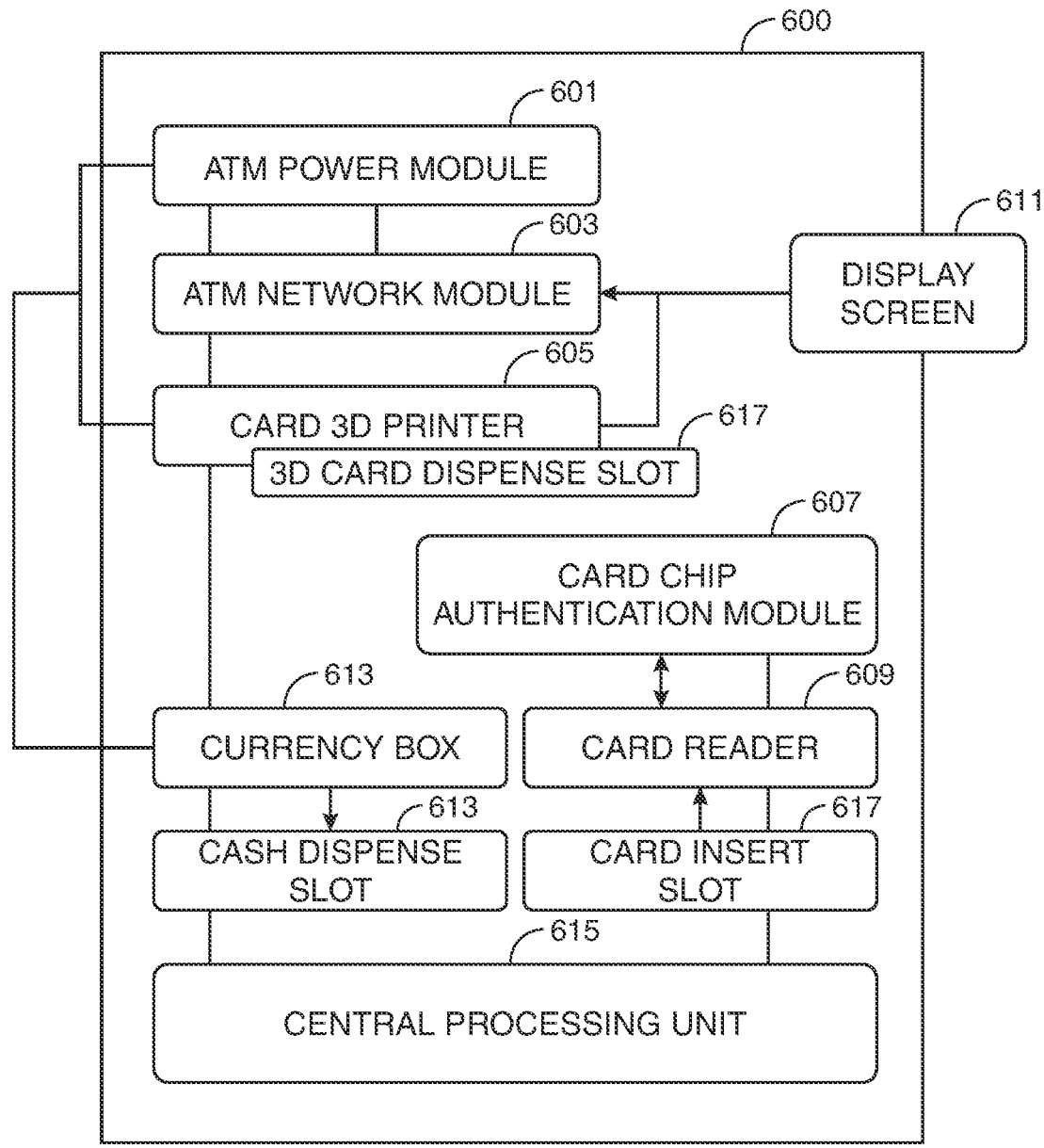
FIG. 7 shows illustrative apparatus in accordance with the invention.

FIG. 7 shows a schematic view of ATM 600. In FIG. 7, Card 3D printer 605 is shown to include 3D card dispense slot 617. Card insert slot 617 is shown to include card reader 607, which in turn is in electronic communication with card chip authentication module 607. Currency box 613 is also shown to include cash dispense slot 614.

Additional lines extending between apparatus illustrated in FIG. 7 show illustrative electronic connections between the apparatus included in ATM 600.

Figure 8:
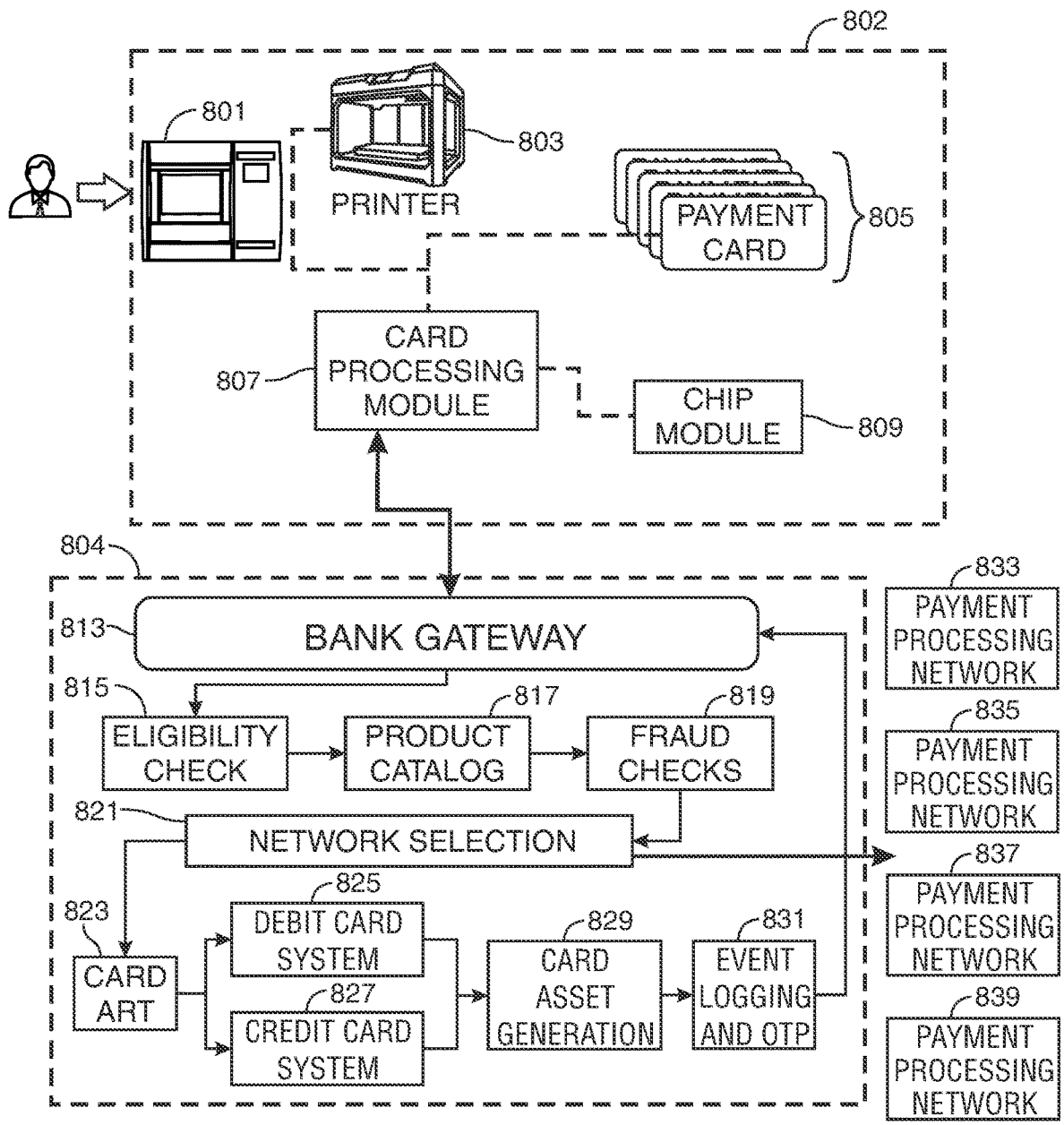
FIG. 8 shows illustrative apparatus and methods in accordance with the invention.

FIG. 8 shows illustrative apparatus and methods in accordance with the invention. FIG. 8 shows illustrative apparatus and methods for supporting the printing of payment instruments at an ATM when the ATM includes a 3D printer.

System 802 may include ATM 801. ATM 801 may include 3D printer 803. ATM 801 may include a stack of payment cards 805. The stack of payment cards may be used as cartridge(s) and/or raw materials for the 3D printer to start printing a payment card. ATM 801 may also include card processing module 807. Card processing module may include chip module 809. Card processing module may be an application run on ATM 801 for authenticating a customer, processing a request to print a payment card, and for interfacing with financial institution platform 804. Chip module 809 may be an application run on the ATM and hardware included in the ATM for programming a primary chip, such as an EMV chip, of a printing payment instrument with payment instrument information.

Card processing module 807 may be in electronic communication with financial services platform 804. Financial services platform 804 may include Bank Gateway 813. Bank Gateway 813 may be a gateway for directing, monitoring and controlling information flowing into, and out of, financial services platform 804.

Bank Gateway 813 may include eligibility check 815, product catalog 817 and fraud checks 819. Eligibility check may determine what credit cards, if any, a requesting customer is eligible to receive. Product catalog 817 may include a database of credit cards currently being offered by an institution and eligibility requirements for each of the credit cards. Fraud checks 819 may include analysis executed by financial services platform to ensure that the request for the payment instrument is not a fraudulent request and is being generated by the customer. Network Selection 821 may list one, two or more payment networks. A customer may select one of the payment networks for his payment card. Exemplary payment networks may include payment processing network 833, payment processing network 835, payment processing network 837 and payment processing network 839.

Bank Gateway 813 may also include card art 823. Card art 823 may store a plurality of card designs from which a customer can select a single card design for applying to his payment instrument.

The system may flow into either debit card system 825, if the customer has selected to generate a debit card, or credit card system 827, if the customer has selected to generate a credit card. Debit card system 825 may be a system for managing debit cards, including reviewing a customer's account balance for ensuring sufficient funds to cover a transaction. Credit card system 827 may manage credit extended by credit card instruments.

After flowing through either debit card system 825 or credit card system 827, the method may pass to card asset generation 829. Card asset generation 829 may store payment instrument metadata, including card type, card art, payment processing network if applicable, and any other card data selected by the customer. The system may then move to event logging and OTP 831, for which a file is created to track and store all activity associated with the payment instrument.

Upon the completion of the flow from bank gateway 813 the data may be used to create the first and second payloads. The first payload may then be transmitted to the card processing module for printing the payment instrument. In embodiments where the ATM is used to print the payment instrument, the first payload may be transmitted to the ATM. The second payload may be stored, in an encrypted state, on a financial services platform until receipt of alignment data, such as an OTP, that triggers decryption of the second payload and transmission of the second payload to an authenticating ATM.

Figure 9:
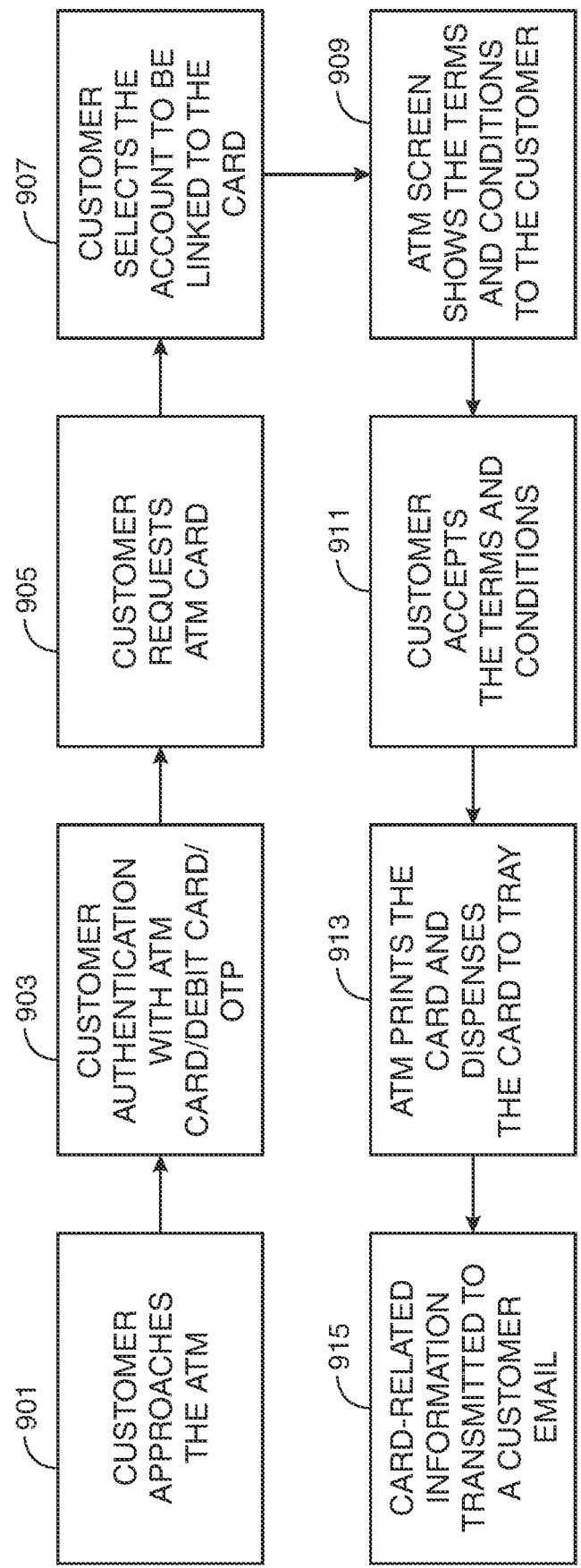
FIG. 9 shows an illustrative method in accordance with the invention.

FIG. 9 shows an illustrative method in accordance with the invention. The method illustrated in FIG. 9 may be a method for printing an ATM card, referred to alternately herein as a debit card, at an ATM using a 3D printer included in the ATM.

At step 901, a customer may approach an ATM. At step 903, the customer may execute a customer authentication process using a customer ATM card, a customer debit card, or by inputting a one-time pin received by the customer into the ATM. At step 905, the customer may request an ATM card. At step 907, the customer may select a customer account to be linked to the ATM card. At step 909, an ATM screen may display terms and conditions of the ATM card to the customer. At step 911, the customer may accept the displayed terms and conditions. At step 913, the ATM may print the ATM card using a 3D printer included in the ATM and dispense the printed card into a tray. At step 915 information relating to the ATM card may be e-mailed to a customer e-mail address.

Figure 10:
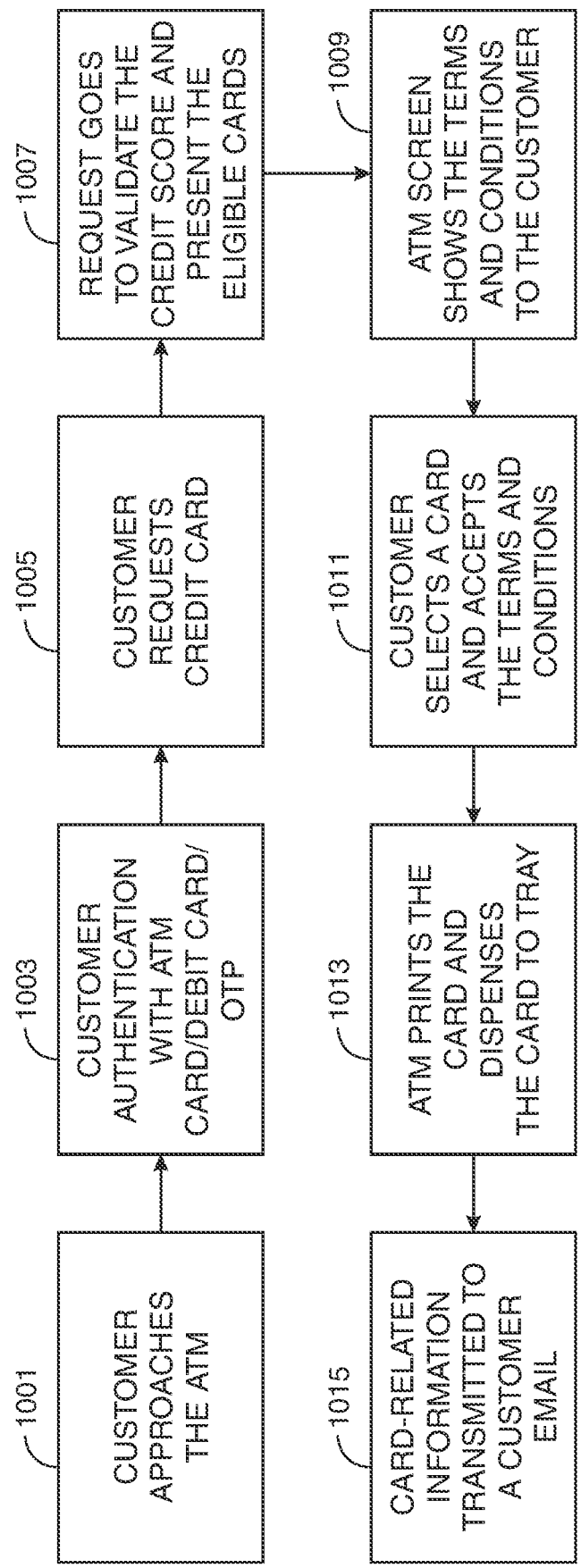
FIG. 10 shows an illustrative method in accordance with the invention.

FIG. 10 shows an illustrative method in accordance with the invention. The method illustrated in FIG. 10 may be a method for printing a credit card at an ATM using a 3D printer included in the ATM.

At step 1001, a customer may approach an ATM. At step 1003, the customer may execute a customer authentication process using a customer ATM card, a customer debit card, or by inputting a one-time pin received by the customer into the ATM. At step 1005, the customer may request a credit card. At step 1007, the ATM may transmit a request to a financial institution platform to validate a credit score of the customer. At step 1007, the ATM may display credit cards to the customer for which the customer has been found eligible to receive.

At step 1009, an ATM screen may display terms and conditions of the ATM card to the customer. At step 1011, the customer may select one of the eligible cards displayed at step 1007 and accept displayed terms and conditions associated with the selected eligible card. At step 1013, the ATM may print the ATM card using a 3D printer included in the ATM and dispense the printed card into a tray. At step 1015 information relating to the credit card may be e-mailed to a customer e-mail address.

Figure 11:
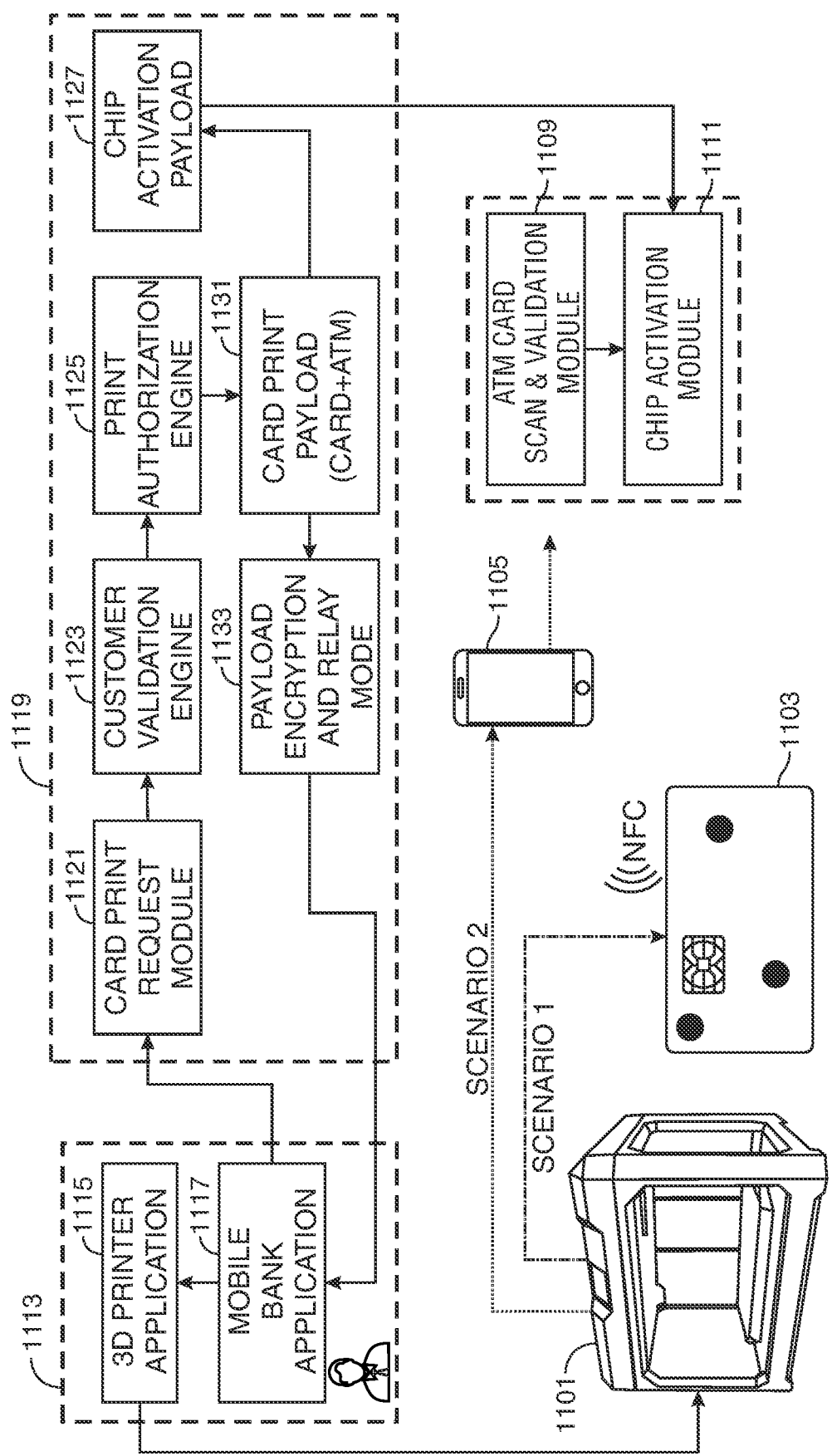
FIG. 11 shows illustrative apparatus and methods in accordance with the invention.

FIG. 11 shows illustrative apparatus and methods in accordance with the invention. Apparatus in FIG. 11 includes 3D printer 1101, mobile phone 1105 and payment instrument 1103. Scenario 1 includes using a 3D printer printing a payment instrument at an ATM. Scenario 2 includes printing a payment instrument at a 3D printer separate from the ATM.

System 1113 may represent applications run on a customer device. System 1113 may include 3D printer application 1115 and mobile bank application 1117. Mobile bank application 1117 may be include 3D printer application 1115. 3D printer application 1115 may be a component of 3D printer 1101.

System 1119 may represent applications run on a financial services platform. System 1119 may include card print request module 1121 for receiving a request from mobile bank application 1117 to print a payment instrument. Customer validation engine 1121 may validate an identity of a customer requesting to print the payment instrument using mobile bank application 1117. Print authorization engine may be initiated once the customer has been validated at step 1123.

Print authorization engine may trigger the generation of card print payload 1131. Card print payload 1131 may generate a first payload and a second payload. The first payload may be payload encryption and relay mode 1133. Payload encrypting and relay mode 1133 may be transmitted to mobile bank application 1117. The second payload may be chip activation payload 1127. Chip activation payload 1127 may be transmitted to an ATM when the customer approaches the ATM, inserts the printed payment instrument into the ATM, and requests to activate the payment instrument. Chip activation payload 1127 may transmit to chip activation module 1111 data to load onto the primary chip of the payment instrument once a location of the supplementary chips has been verified. ATM card scan and validation module 1109 may validate the payment instrument prior to triggering chip activation module 1111 to activate the primary chip of the payment instrument.

Thus, systems and methods for printing a payment instrument and activating the payment instrument have been provided. Persons skilled in the art will appreciate that the present invention can be practiced by other than the described embodiments, which are presented for purposes of illustration rather than of limitation.

What is claimed is:

1. A payment instrument for executing a transaction, the payment instrument having an outer face and a thickness and comprising:
   a primary means positioned on the outer face;
   a first means for:

drawing power from a power source;
communicating with the primary means using near field communication ("NFC") protocol;
emitting a first NFC signal when powered by the power source; and
storing first position information and transmitting the first position information to the primary means via NFC;
a second means for:
drawing power from the power source;
communicating with the primary means using NFC protocol;
emitting a second NFC signal when powered by the power source; and
storing second position information and transmitting the second position information to the primary means via NFC; and
a third means for:
drawing power from the power source;
communicating with the primary means using NFC protocol;
emitting a third NFC signal when powered by the power source; and
storing third position information and transmitting the third position information to the primary means via NFC;

wherein:
the first, second and third means are within the thickness; and
the primary means for:
receiving the transmitted first, second and third position information and transmitting the received first, second and third position information to a POS device during the transaction.

2. The payment instrument of claim 1 wherein each of the first, second, and third means comprises an erasable programmable read-only memory.

3. The payment instrument of claim 1 wherein the first position information is a first X,Y coordinate, the second position information is a second X,Y coordinate, and the third position information is a third X,Y coordinate.

4. The payment instrument of claim 1 wherein the payment instrument is a credit card and includes imprinted data, the imprinted data including a CVV code, a card expiry date, a customer name and a name of a payment processing network.

5. The payment instrument of claim 1 wherein the primary chip is an EMV chip.

6. The payment instrument of claim 1 wherein the primary means is configured for storing a gift card value.

* * * * *